United States Patent [19]

Trachte

[11] Patent Number: 4,725,002
[45] Date of Patent: Feb. 16, 1988

[54] MEASURING VALVE FOR DOSING LIQUIDS OR GASES

[75] Inventor: Dietrich Trachte, Sao Paulo, Brazil

[73] Assignee: Robert Bosch GmbH, Stuttgart, Fed. Rep. of Germany

[21] Appl. No.: 906,919

[22] Filed: Sep. 11, 1986

[30] Foreign Application Priority Data

Sep. 17, 1985 [DE] Fed. Rep. of Germany ....... 3533085

[51] Int. Cl.$^4$ .................. B05B 1/30; F02M 61/08; F02M 51/06
[52] U.S. Cl. .............................. 239/102.2; 239/533.2; 310/327
[58] Field of Search ............... 239/533.2, 533.3, 533.8, 239/102.2; 188/297, 298; 310/327, 326

[56] References Cited

U.S. PATENT DOCUMENTS

| | | | |
|---|---|---|---|
| 4,441,101 | 4/1984 | Robar | 310/327 |
| 4,531,676 | 7/1985 | Siefert et al. | 239/533.3 |
| 4,575,008 | 3/1986 | Kaczynski | 239/533.3 |
| 4,605,171 | 8/1986 | Trachte et al. | 239/533.3 |

FOREIGN PATENT DOCUMENTS 1751543 8/1970 Fed. Rep. of Germany ... 239/102.2
2056559 3/1981 United Kingdom .

*Primary Examiner*—Andres Kashnikow
*Assistant Examiner*—Karen B. Merritt
*Attorney, Agent, or Firm*—Michael J. Striker

[57] ABSTRACT

A metering valve includes a piezoelectric cylinder connected via a spring biased needle to a valving element for closing a metering opening. To compensate for slow changes in the length of the piezoelectric control member, there is provided a damping piston connected axially to the piezoelectric member and being movable in a well formed in the valve housing and defining with the end face of the piston a damping chamber. A tubular membrane surrounds a portion of the damping piston and is attached to the piezoelectric member and to an inner wall of the housing around the opening of the well to define with the piston an annular equalizing space. The damping and equalizing spaces are filled with liquid and communicate with one another via a narrow throttling gap formed between facing walls of the well and of the piston.

7 Claims, 1 Drawing Figure

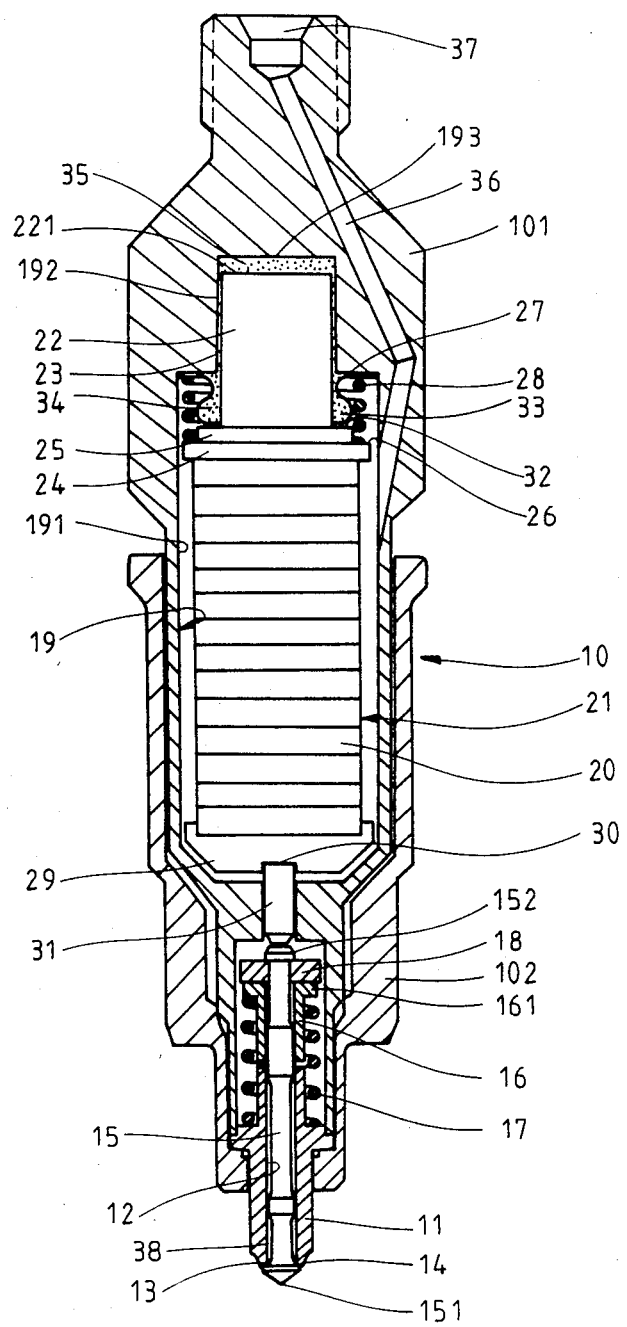

MEASURING VALVE FOR DOSING LIQUIDS OR GASES

BACKGROUND OF THE INVENTION

The present invention relates in general to metering valves for dosing liquids or gases and in particular to a fuel injection valve for use in fuel injection systems of internal combustion engines, for example in direct injection for diesel engines and the like. The metering valve is of the type which includes a valve housing provided with a metering opening, a valve needle passing through the metering opening and being connected at its free end with a valving element, a biasing spring arranged between the housing and the opposite end of the needle to urge the valving element into its closing position against a valve seat around the metering opening, piezoelectric control member arranged in the housing in alignment with the needle, another biasing spring for urging the piezoelectric control member against the opposite end of the needle, and damping means arranged in the housing and cooperating with the piezoelectric control member to compensate for position changes of the member relative to the housing.

In a known measuring valve of this kind (GB Publication No. 2,056,559) the arrangement of the piezoelectric control member, the needle and the valving element is designed such that the valving element is displaced from the valve seat in response to the contraction of a column of stacked piezoelectric elements. Biasing spring supported on the housing and arranged in a damping space communicating with a fuel inlet engages the side of the damping piston which is remote from the piezoelectric stack and urges the valve needle with its valving element into its closing position. The mass of the damping piston and the damping effect of fuel in the damping space are adjusted such that during the short contraction phase of the piezoelectric stack the damping piston due to the inertia of its mass remains stationary and does not move in the valve closing direction even if subject to the valve closing spring. Consequently, in each dosing phase the valve needle and its valving element always perform the same opening stroke. If the valve is closed the piezoelectric stack due to temperature fluctuations exhibits corresponding changes in its length and the damping piston is shifted accordingly. In the same manner, wear and manufacturing tolerances of the operational system formed by the valve needle, piezoelectric stack and the damping piston are compensated for and cannot affect the regulating distance of the valve needle relative to the metering opening of the valve.

However, it has been found that the prior art design for fixing the momentary position of the piezoelectric stack in the housing during the dosing phase cannot be applied to those embodiments where the extension of the piezoelectric stack is used for actuation of the valve needle and its valving element. In such cases pressure acting on the damping piston due to extension of the piezoelectric stack causes a perceptible shift of the damping piston in spite of the relatively minute total displacement of the piezoelectric stack amounting typically to 30 microns. This displacement of the piston is caused by the fact that fuel present in the damping space moves practically without damping and consequently it flows very fast through the connection conduit to the fuel inlet. Only at a strong throttling of the discharged fuel a momentary displacement of the damping piston due to the expanding piezoelectric stack can be prevented provided that the damping piston has a very large mass. Such massive damping pistons however require a relatively large installation space which would interfere with the desired small volume of the metering valve. On the other hand, even a very small shift of the fixed position of the piezoelectric stack relative to the housing during the measuring phase due to the small controlling movements of the piezoelectric stack prevents a highly accurate and reliably reproducible fuel dosing.

SUMMARY OF THE INVENTION

It is therefore a general object of the present invention to overcome the disadvantages of prior art metering valves.

In particular it is an object of this invention to provide a metering valve using a piezoelectric control member which upon electrical excitation transfers its changes in length to the valving element and which maintains the advantage of neutralizing slow changes due to temperature, wear and manufacturing tolerances to obtain a high accuracy and reliable reproducibility of strokes of the valve needle.

Another object of this invention is to provide such an improved metering valve which is small in size and which permits an extremely accurate metering even of very small doses as required for example in fuel injection systems in motor vehicles.

In keeping with these objects and others which will become apparent hereafter, one feature of this invention resides in the provision of a metering valve of the above described kind which includes a valve housing having at one end part thereof an outlet passage terminating with a metering opening, a valve seat surrounding the metering opening, a valving element for closing the valve seat, a valve needle connected at one end thereof to the valving element and passing through the outlet passage, spring means arranged between the housing and the opposite end of the needle to urge the valving element into a closing position against the valve seat, a piezoelectric control member arranged in the housing in axial alignment with the needle, means for connecting an end face of the piezoelectric control member to the other end of the needle to displace the valving element from its closing position when the piezoelectric control member is energized, damping means arranged between an opposite end part of the housing and an opposite end face of the piezoelectric control member to fix the position of the latter during fast changes of its length, and throttling means cooperating with the damping means to compensate for slow changes in position of the piezoelectric control member relative to the housing caused by slow changes in length of piezoelectric control member.

In the preferred embodiment of this invention, the piezoelectric control is arranged in an intermediate part of the housing, the damping means comprise a damping well formed in the end part of the housing opposite the end part provided with the outlet passage, a cylindrical damping piston attached to the opposite end face of the piezoelectric control member and partially projecting into the damping well to delimit therewith a damping space, a tubular membrane arranged in the intermediate housing part around the damping piston, the ends of the membrane being attached respectively to the housing around the opening of the well and to a peripheral portion of the opposite end face of the piezoelectric control to delimit with a portion of the piston an annular equalizing space, the throttling means including an annular throttling gap formed between the facing walls of the damping piston and the damping well, and damping liquid filling the damping and equalizing spaces and the throttling gap.

By virtue of the resulting encapsuled liquid filled throttling system in which liquid cushions in the damping and equalizing spaces are interconnected by very narrow throttling annular gap, it is guaranteed that liquid cushions are completely devoid of gas and consequently they are completely incompressible and retain a constant volume even when the piezoelectric stack is expanded upon application of an excitation voltage. As a consequence, the position of the damping piston and of the piezoelectric stack remains stationary during the opening of the valve. Inertia of the mass of the damping piston in the valve of this invention has no noticeable effect and consequently the damping piston can be designed with relatively small dimensions and the resulting overall volume of the metering valve can be kept very small. Quasistatic processes such as for example changes in length of the piezoelectric stack, of the valve needle or of the damping piston due to ambient temperature, wear and manufacturing tolerances however, permit leakage of the damping liquid through the throttling gap, thus allowing a neutralizing shift of the damping piston and consequently the piezoelectric stack in spite of its slow change in length retains its constant position relative to the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates an axial cross-section of a fuel injection valve according to this invention for use in a diesel engine having a direct fuel injection.

DESCRIPTION OF THE PREFERRED EMBODIMENT

The metering valve illustrated in the drawing can be in general employed for metering doses of liquids and gases and in this example it is used as a directly injecting valve for diesel engines. It includes a two-part valve housing 10 whose upper housing part 101 is inserted into the lower housing part 102. A valve body 11 is clamped between the housing parts 101 and 102. The valve body includes an axial outlet passage 12 projecting through the lower housing part 102 and terminating at its free end with a metering opening 13. The metering opening is surrounded by a valve seat 14 which is selectively closed or opened by a valving element 151 having a mushroom shape. The valving element is integral with a valve needle 15 passing through the axial outlet passage 12. The engaging surfaces of the needle head or valving element 151 and of the valve seat 14 are slanted relative to the axis of the bore 12 to create a spray of injected fuel forming an angle of about 150° with the center axis. Under this angle the spray of fuel is injected into the combustion space of an internal combustion engine.

The end portion of the valve needle 15 opposite the valving element 151 protrudes from the valve body 11 into the interior of the housing and is surrounded by a sleeve 16 which at its end is formed with a flange 161 supporting an abutment ring 18. The part of valve needle 12 projecting above the disk 18 is bulged out to provide a limit stop for the sleeve 16. A helical spring 17 surrounds the sleeve 16 and engages the annular flange 161 of the sleeve and an annular shoulder on the valve body 11. In this manner, the spring 17 urges the valve member 151 into its closing position against the valve seat 14.

The upper housing part 101 is formed with a stepped blind bore 19 defining an intermediate chamber 191 of larger diameter communicating with a well 192 of smaller diameter. The intermediate chamber 191 houses a stack of piezoelectric disks 20 assembled in conventional manner to form a cylindrical piezoelectric control member 21 which upon application of an excitation voltage of is extended in length. A damping piston 22 is partially inserted into the well 192. The damping piston is dimensioned such as to form a very narrow throttling gap 23 with the inner wall of the well 192. An end face of the damping piston 22 is connected to the opposite end face of the piezoelectric control member 21 by stepped rings 24 and 25. Lower annular step 26 supports a helical pressure spring 28 whose other end engages a shoulder 27 between the intermediate chamber 191 and the well 192. The spring 28 biases the piezoelectric control member 21 together with the damping piston 22 in the axial direction against the valve needle 15. The other end of the piezoelectric control member 21 is provided with a cap 29 formed with a central recess 30 for receiving a transmission bolt 31. The transmission bolt is guided in the housing part 101 against the bulged out end portion 152 of the needle 15 and consequently the stack 20 of piezoelectric elements is in continuous engagement with the valve needle. The biasing force of the helical spring 28 acting on the piezoelectric stack is substantially smaller than that of the valve closing spring 17. Accordingly, when the piezoelectric control member is de-energized the spring 17 reliably holds the valving member 151 in its closed position.

A tubular membrane 33 surrounds the damping piston 22 and is attached at one end thereof to the upper step 32 of the supporting ring 25 and the other end portion of the membrane is clamped by the helical spring 28 against the annular shoulder 27 of the housing part 101. In this manner, the membrane 33 delimits with the lower portion of damping piston 192 an annular equalizing space 34 which is hermetically sealed off from the intermediate chamber 191. The upper end face 221 of the damping piston delimits with the bottom wall 193 of the well 192 a damping space 35. Communication between the damping and equalizing spaces 35 and 34 is established by the narrow throttling gap 23. The spaces and the gap are filled with a damping liquid. As mentioned before, the damping liquid is hermetically sealed from the intermediate chamber by the membrane 33.

The intermediate chamber 191 serves as a storage space for fuel and is connected via a supply conduit 36 to a fuel supply connection 37 at the end of the upper housing part 101. An annular space 38 formed in the valve body 11 between the inner wall of outlet passage 12 and an end portion of valve needle 15 is connected with the intermediate chamber 191 by a non-illustrated connection conduit in the housing part 102. The annular space 38 immediately communicates with the metering opening 13.

The operation of the described fuel injection valve of this invention is as follows:

In closed condition of the valve, fuel in the intermediate chamber and in the closed metering annular space 38 is under a controlled pressure. If an excitation voltage is applied to the piezoelectric stack 20, the latter increases in length in axial direction about a predetermined amount, typically about 20 microns. This extension in length which occurs very rapidly, is transmitted via cap 29 and transmission bolt 31 to the valve needle 15 which in turn depresses the biasing spring 17 and lifts by a corresponding stroke the valving element 151 from the valve seat 14. The shift of the valve needle 15 and hence the lift of the valving element 151 corresponds exactly to the prolongation of the piezoelectric stack 20 because the latter is firmly supported by means of the damping piston 22 on the incompressible liquid cushion in the damping space 35. In the case of very short switching or actuation intervals of the piezoelectric stack 20 the throttling annular gap 23 prevents any flow of liquid from the damping space 35.

On the other hand, if the piezoelectric stack 20 is subject to slow changes in length due to increasing temperature in the engine for example, the throttling gap 23 allows the damping piston 22 to move into the space 35, thus neutralizing the change in length. The ambient temperature fluctuations are slowly occurring quasi static processes and consequently the slow pressure exerted by the piezoelectric stack 20 against the damping piston 22 slowly displaces liquid from the damping space 35 through the throttling gap 23 into the equalizing space 34. After the equalizing process is completed pressure in equalizing space 34 equals the pressure in damping space 35, and the position of the stack 20 is again fixed relative to the housing 10 and its change in length is compensated for by the displacement of the damping piston. Accordingly, when the stack 20 is activated, then the predetermined constant controlling displacement of 20 microns is again accurately transmitted to the valve needle 15 and the effect of the long term changes in length due to ambient temperature fluctuations is reliably eliminated. In the same manner the position changes caused by wear or manufacturing tolerances in the valve are neutralized by the before described cooperation between the damping valve 22, piezoelectric stack 20, cap 29 and transmission bolt 31.

The intermediate housing chamber 191 which serves as a fuel storage space prevents an excessive pressure drop during the injection process. The closing of the valving member 151 takes place against the fuel pressure and consequently no uncontrolled doses or leakage can occur. Due to the direct injection of fuel immediately following the metering by the opening 13 a correct atomization or spraying of the fuel is guaranteed.

While the invention has been illustrated and described as embodied in a specific application of the metering valve, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention.

What is claimed as new and desired to be protected by Letters Patent is set forth in the appended claims:

1. A metering valve for dosing liquids or gases, particularly an injection valve for a fuel injection system of an internal combustion engine, comprising a valve housing having an end part provided with an outlet passage terminating with a metering opening; a valve seat surrounding said metering opening; a valving element for closing the valve seat; a valve needle connected at one end thereof to said valving element and passing through said outlet passage; spring means arranged between said housing and the opposite end of the needle to urge said valving element into a closing position against said valve seat; a piezoelectric control member resiliently supported in said housing in axial alignment with said needle; means for transmitting axial extensions of the piezoelectric control member to said needle to displace said valving element from its closing position when activated; damping means arranged between an opposite end part of the housing and said piezolectric control member to fix relative position of the same during fast changes of its length; and throttling means cooperating with said damping means to compensate for slow changes in length of the piezoelectric control member so as to maintain a constant position of the latter relative to said housing, said piezolectric control member being arranged in an intermediate part of the housing, said damping means including a well formed in said opposite end part of the housing and opening into said intermediate housing part, a damping piston attached to said opposite end face of the piezoelectric control member and partially projecting into said well, a tubular membrane arranged in said intermediate housing part around said damping piston to delimit therewith an annular equalizing space; said throttling means including an annular throttling gap between the facing walls of said damping piston and said well; and said damping and equalizing spaces being filled with a damping liquid and communicating with each other through said throttling gap.

2. A metering valve as defined in claim 1, wherein said engine is a diesel engine having a direct fuel injection system.

3. A metering valve as defined in claim 1, wherein said damping piston is connected to said piezoelectric control member by a stepped ring defining an inner annular shoulder of smaller diameter and an outer annular shoulder of larger diameter, a rim portion of said membrane being attached to said inner annular shoulder and the opposite ring portion of said membrane being attached to a housing shoulder around the opening of said well; and a biasing spring supported at one end thereof on said outer annular shoulder of said stepped ring and, at the other thereof, on said housing shoulder to urge said piezoelectric control member in axial direction against said valve needle.

4. A metering valve as defined in claim 3, wherein the other end of said biasing spring engages said other rim portion of said membrane.

5. A metering valve as defined in claim 3, wherein said spring means for closing said valving element includes a flanged sleeve slidably enclosing a portion of said valve needle remote from said valving element, a closing spring arranged between said housing and a flange of said sleeve, an abutment disk supported on said flange and being connected to said valve needle.

6. A metering valve as defined in claim 5, wherein the end of said piezoelectric control member facing said needle is provided with a terminal cap connected to a transmission bolt, said transmission bolt engaging the end of said valve needle projecting above said abutment disk.

7. A metering valve as defined in claim 6, wherein said intermediate housing part is of larger diameter than said piezoelectric member to provide for an annular fuel storage space communicating with a fuel supply conduit; and an annular dosing chamber formed between said valve needle and an inner wall portion of said outlet passage adjoining said outlet opening, said annular metering chamber communicating with said intermediate housing part.

* * * * *